Dec. 3, 1963
R. Y. MINER ETAL
3,113,203
ORDNANCE CALCULATOR
Filed Jan. 20, 1950
2 Sheets-Sheet 1
FIG.I.
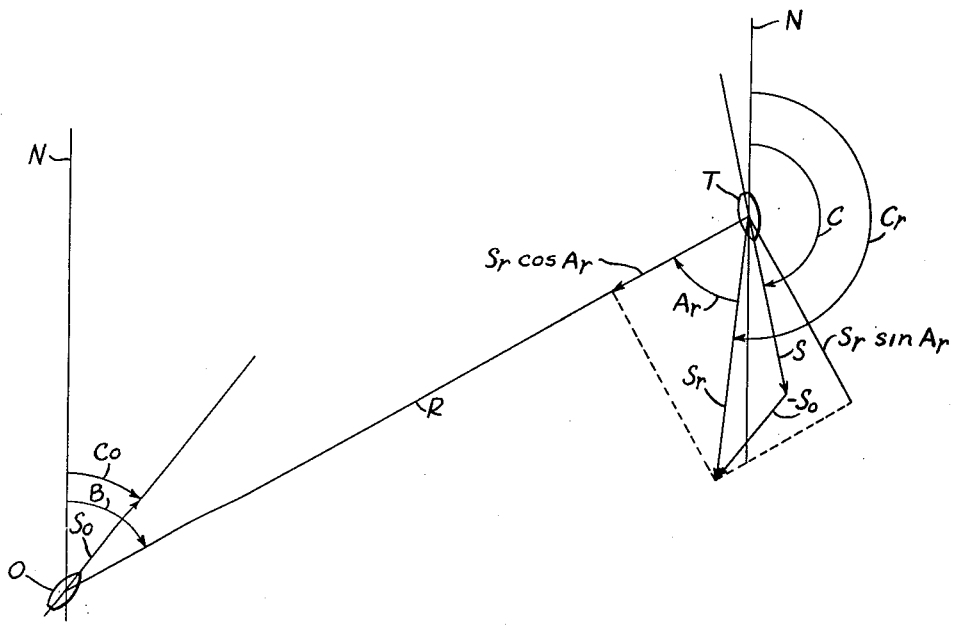
INVENTORS:
RICHARD Y. MINER
CHARLES D. BOCK
BY
THEIR ATTORNEYS

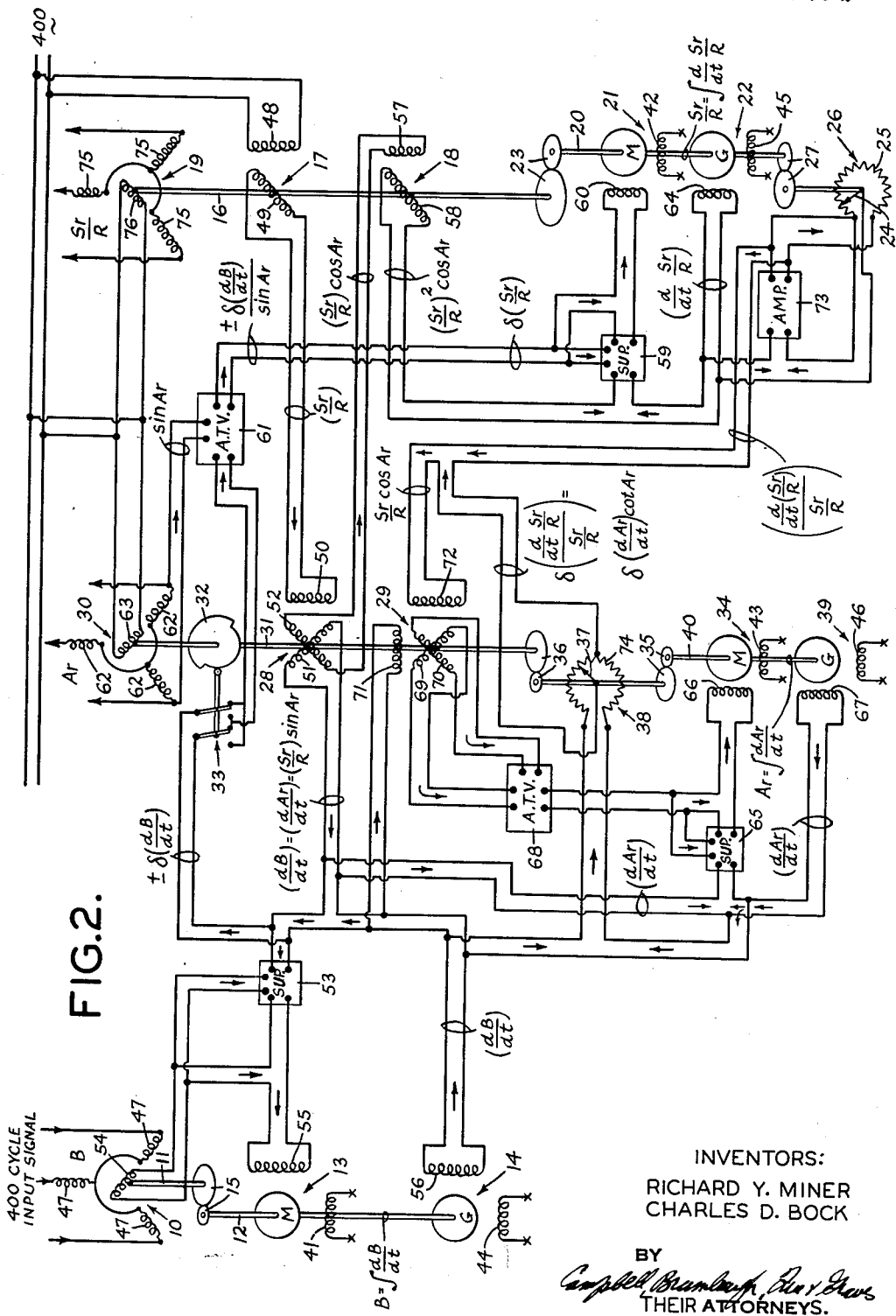

United States Patent Office 3,113,203
Patented Dec. 3, 1963

3,113,203
ORDNANCE CALCULATOR
Richard Y. Miner and Charles D. Bock, New York, N.Y., assignors to American Bosch Arma Corporation
Filed Jan. 20, 1950, Ser. No. 139,704
21 Claims. (Cl. 235—61.5)

This invention relates to calculating apparatus, and has particular reference to an electromechanical computer for analyzing observed target bearing angle and computing other required values for use in a gun fire control system, this computer being hereinafter called "bearing only analyzer."

It is known that for a target moving on a straight course with constant speed, the continual observation of the target bearing angle, B, supplies sufficient data for the production of the values of the relative target angle, $Ar$, and the ratio of relative speed to target range $$\frac{Sr}{R}$$

In accordance with the present invention, a calculating apparatus is provided which solves three simultaneous differential equations involving the aforementioned three dependent variables, viz., B, $Ar$, and $$\frac{Sr}{R}$$

and one independent variable, time, by means of computing circuits containing elements of the electromechanical type, in a manner such that the solution also is automatically and continually corrected by a continuous or interrupted input of the observed target bearing.

For a more complete understanding of the invention, reference may be had to the accompanying drawings in which:

FIGURE 1 is a schematic diagram illustrating the gun fire control problem which is to be solved, assuming an attacking surface ship and a surface target ship; and FIG. 2 is a schematic electrical and mechanical diagram of the calculating apparatus for solving problems such as is indicated in FIG. 1 as one example.

Referring to FIG. 1 of the drawing, the attacking vessel O, hereinafter called "own ship," is represented as traveling on a course $Co$ with a speed of $So$, while the target T is moving with a speed of S along a course C. The relative speed and course of the target T with respect to own ship O are therefore $Sr$ and $Cr$. The true bearing of the target T is B and the range of the target T is R. The angle $Ar$ is the angle between the line of sight to the target T and the relative target course $Cr$, measured clockwise from the relative course $Cr$.

The relative target speed, $Sr$, at any instant may be resolved into the rectangular components $Sr \sin Ar$, perpendicular to the line of sight, and $Sr \cos Ar$ along the line of sight. From the geometry of the problem, $$Sr \sin Ar = R\frac{dB}{dt}$$

which may be rewritten as $$\frac{dB}{dt} = \frac{Sr}{R} \sin Ar \tag{1}$$

$$Sr \cos Ar = -\frac{dR}{dt}$$

which may be simplified by the following steps, $$\frac{dR}{dt} = -Sr \cos Ar$$

$$\frac{d(R)}{dt(Sr)} = -\cos Ar$$

into $$\frac{d(Sr)}{dt(R)} = \left(\frac{Sr}{R}\right)^2 \cos Ar \tag{2}$$

and $$\frac{dB}{dt} = \frac{dAr}{dt}$$

which may be rewritten as, $$\frac{dAr}{dt} = \frac{Sr}{R} \sin Ar \tag{3}$$

The equations 1, 2, 3 are the three differential equations for which a solution is generated by the bearing only analyzer of this invention, such that the generated rate values of $$\frac{dB}{dt}, \frac{dAr}{dt} \text{ and } \frac{d(Sr)}{dt(R)}$$

correspond to the observed change of the bearing angle, as will be described.

In case the cooperating generating components lose synchronism with the true values, the generating rates of the bearing only analyzer are made to approach the actual rates by means of correcting circuits arranged to make such corrections. In order to accomplish this, a knowledge of the variations of $$\frac{Sr}{R} \text{ and } \frac{\frac{d}{dt}\left(\frac{Sr}{R}\right)}{\frac{Sr}{R}}$$

is necessary, and these values are found to be $$\delta\frac{Sr}{R} = \frac{1}{\sin Ar}\delta\frac{dB}{dt} \tag{4}$$

and $$\delta\frac{\frac{d}{dt}\left(\frac{Sr}{R}\right)}{\frac{Sr}{R}} = \cot Ar \, \delta\frac{dAr}{dt} \tag{5}$$

where the symbol "$\delta$" indicates "variation of."

The value of $$\delta\left(\frac{Sr}{R}\right)$$

which establishes the constant of integration in Equation 2 is automatically added in the bearing only analyzer to the value of $$\frac{Sr}{R}$$

generated by the integration of $$\frac{d(Sr)}{dt(R)}$$

while $$\delta\frac{\frac{d}{dt}\left(\frac{Sr}{R}\right)}{\frac{Sr}{R}}$$

is used in determining a corrected value of $$\left(\frac{Sr}{R}\right) \cos Ar$$

for use in correction of the generated value of $Ar$. In the following discussion, the ratio $$\frac{Sr}{R}$$

is indicated by the symbol U and $$\frac{d(Sr)}{dt(R)} \text{ by } \frac{dU}{dt}$$

Referring to the schematic representation of the bearing only analyzer of this invention as shown by FIG. 2, numeral 10 designates a control transformer whose rotor winding 54 is driven by a shaft 11 which is driven by the shaft 12 common to the rotor of two-phase induction motor 13 and linear induction generator 14, through appropriate gearing 15. Similarly, the rotor windings 49 and 58 of induction potentiometers 17, 18 and the rotor winding 76 of self synchronous generator 19 are driven by shaft 16 which is rotated by the shaft 20 common to the rotors of motor 21 and generator 22, through gearing 23. The rotation of the rotor windings 49 and 58 of induction potentiometers 17, 18 is limited to approximately 42° in order to maintain a linear relationship between the input and output voltages. Shaft 20 also drives the arm 24 of potentiometer 26 about its resistance winding 25 through gearing 27.

Numerals 28 and 29 designate electromechanical induction resolvers which are essentially transformers having fixed primary windings arranged in space quadrature, and having secondary windings also arranged in space quadrature and which may be set to an angle in the combined primary field so that the induced voltages are proportional to the primary voltage inputs and to trigonometric function of the rotor angle. Thus the rotor windings 51 and 52 of resolver 28 and rotor windings 69 and 70 of resolver 29 are rotated in the fields of respective primary stator windings 50, 71, 72 by common shaft 31, which also rotates the rotor winding 63 of self synchronous generator 30 and the cam 32 of reversing switch 33. Cam 32 is so arranged that reversing switch 33 is actuated during positions of shaft 31 between 180° and 360°, thus causing the polarity of the output voltage from the switch to be the reverse of the polarity during positions of shaft 31 between 0° and 180° for the same input signal.

Shaft 31 is driven by motor 34 through reduction gearing 35 and 36, which causes the movable arm 37 of cam potentiometer 38 to be driven at a speed of two revolutions for each revolution of shaft 31. The rotor of generator 39 is mechanically connected to the rotor of motor 34 by shaft 40.

In the interest of simplicity, the showing of the usual motor and generator amplifiers, resolver booster amplifiers, isolation transformers and time delay circuits have been omitted in FIG. 2, it being understood that they will be employed and would be of conventional construction. The main fields 41, 42, 43 of motors 13, 21 and 34 and the main fields 44, 45, 46 of linear generators 14, 22, 39 for all connected to an appropriate 400 cycle voltage supply, and the arrows in FIG. 2 indicate the direction of power flow. Control transformer 10 receives a 400 cycle signal input to its stator windings 47 equivalent to the observed bearing angle, B, from a self synchronous generator, not shown, but whose output is indicated by the arrows to the three-phase stator windings 47. A constant 400 cycle voltage is applied across the stator winding 48 of induction potentiometer 17, the displacement of whose rotor 49 through an angle which is a measure of U, induces in the rotor winding 49 a voltage proportional to U, which is applied across the stator winding 50 of resolver 28, as shown.

The combination of motor 13, linear generator 14 and suppressor 53, connected as shown in FIG. 2, constitutes an integration circuit in which the integrated value of the signal input is constantly checked with the observed value. Suppressor 53 is an electronic voltage amplifier in which the gain is regulated by a separate control voltage, and whose gain is relatively high for a small control signal, whereas a large control signal causes complete suppression of the input signal. During the normal action of the aforementioned integration circuit, the control voltage of suppressor 53 is zero, so that the input signal to suppressor 53 controls motor 13.

The integrator input voltage, computed $$\frac{dB}{dt} = U \sin Ar$$

which is supplied by rotor winding 51 of resolver 28 when its rotor is displaced by an angle $Ar$ from the zero position by rotation of shaft 31 by motor 34, is applied so that the difference voltage between the integrator input from rotor winding 51 and the generator 14 output voltage from output winding 56 controls motor 13 by being impressed on its control field winding 55 through suppressor 53. The motor 13 drives generator 14 at a speed such that the output voltage of the generator 14, generated as $$\frac{dB}{dt}$$

equals the integrator input voltage from winding 51, i.e., computed $$\frac{dB}{dt}$$

Therefore, because of the linear characteristics of the generator 14, the rotational velocity of shaft 12 of motor 13 continuously corresponds to $$\frac{dB}{dt}$$

and hence the angular position of the output shaft 12 continuously represents the value B.

The control input of suppressor 53, which is also connected in series with the output of suppressor 53 across the control field winding 55 of motor 13 as shown in FIG. 2, is the voltage induced in rotor winding 54 of control transformer 10 as a result of the angular displacement between the actual position of rotor 54, and the null position thereof corresponding to the signal input to the stator windings 47 of control transformer 10. The control input to suppressor 53 is not zero while a disagreement exists between the calculated and observed values of B, and during that time the response of the system to the signal from winding 51 is suppressed so that the motor 13 is controlled by the control signal to suppressor 53. Shaft 11 is driven to the position where the angular displacement of the rotor 54 of control transformer 10 corresponds to the signal input to stator windings 47, thereby reducing the control voltage to zero and allowing the integration of the signal $U \sin Ar$ to be resumed.

The voltage induced in rotor winding 52 of resolver 28 which is proportional to $U \cos Ar$, is applied to the stator winding 57 of induction potentiometer 18, thus causing a voltage to be induced in the rotor winding 58 proportional to the computed $$\frac{dU}{dt} = U^2 \cos Ar$$

which is applied to the integrator composed of motor 21 and linear generator 22, where the integrated value of U is continuously corrected by the use of the suppressor 59.

The control signal input to suppressor 59, which is also connected in series with the output of suppressor 59 across the control field winding 60 of motor 21, is the output of vacuum tube attenuator 61, which is a variable gain amplifier in which the control signal controls the amplifier gain. Although the vacuum tube attenuator and the suppressor have comparable functions, that of amplifying more when the control input is small than when the control input is large, they are constructed to conform to different operating characteristics. Since the output of a vacuum tube attenuator is directly proportional to the signal input and inversely dependent on the control input, the output is substantially proportional to the ratio of $$\frac{\text{signal input}}{\text{control input}}$$

The signal input to suppressor 53, $$\delta\frac{dB}{dt} = \text{computed } \frac{dB}{dt} - \text{generated } \frac{dB}{dt}$$

fed through reversing switch 33 is the signal input to vacuum tube attenuator 61. The control input of vacuum tube attenuator 61 is supplied by two stator windings 62 of self synchronous generator 30. A 400 cycle voltage is impressed across the rotor winding 63 of self synchronous generator 30, and the rotor is positioned at an angular displacement of $Ar$ from the zero position so that the voltage induced in stator windings 62 and fed as control input to vacuum tube attenuator 61 is proportional to sin $Ar$, and the output of the attenuator 61 is substantially proportional to $$\frac{1}{\sin Ar} \delta\frac{dB}{dt} = \delta U$$

Although the polarity of the input voltage of suppressor 53 is transmitted through the attenuator 61, the control voltage from stator windings 62 merely causes attenuation of the input voltage, so that the polarity of the control signal is lost. Therefore, reversing switch 33 is provided in order to maintain the correct polarity of the output signal. For values of $Ar$ between 180° and 360°, when sin $Ar$ is negative, cam 32 is arranged to actuate reversing switch 33 so that the signal voltage to vacuum tube attenuator 61 has a polarity opposite to that of $$\delta\frac{dB}{dt}$$

while for values of $Ar$ between 0° and 180°, when sin $Ar$ is positive, cam 32 maintains reversing switch 33 in the normal position, so that the signal voltage to attenuator 61 has the same polarity as $$\delta\frac{dB}{dt}$$

When the control voltage of suppressor 59 is zero, thereby indicating a correct value of U since $\delta U$ is zero, motor 21 and linear generator 22 integrate the computed signal $$\frac{dU}{dt}$$

from rotor winding 58 of induction potentiometer 18, thus producing U as measured by the angular displacement of shaft 16, in a manner similar to the aforementioned integration of $$\frac{dB}{dt}$$

as performed by motor 13 and generator 14. However, when $\delta U$ is not zero, the integrator signal is cut off and the control input to suppressor 69 controls motor 21 driving motor 21 until the value of $$\frac{1}{\sin Ar} \delta\frac{dB}{dt} = \delta U$$

becomes zero, at which time the integration of $$\frac{dU}{dt}$$

is resumed.

The signal from the rotor winding 51 of resolver 28, $$U \sin Ar = \text{computed } \frac{dAr}{dt}$$

is integrated in a manner similar to the integration of $$\frac{dU}{dt}$$

in a circuit consisting of motor 34, linear generator 39 and suppressor 65, in which the output of suppressor 65 is connected in series with its control signal across the control field winding 66 of motor 34, and the generator 39 output signal, generated $$\frac{dAr}{dt}$$

which is induced in its output winding 67, is connected in series opposition with the integrator signal across the signal input terminals of suppressor 65. Hence, the value of $Ar$ is measured by the angular displacement of shaft 31.

The control signal of suppressor 65 is the output of vacuum tube attenuator 68 whose inputs are supplied by the rotor windings 69 and 70 of resolver 29, these rotor windings being rotated through $Ar$ by shaft 31. Across the resolver 29 stator winding 71 is applied $$\frac{dB}{dt} = U \sin Ar$$

from the output winding 56 of generator 14 and across the stator winding 72 is applied $$U \cos Ar = \frac{dU}{Udt} + \delta\frac{dU}{Udt}$$

Of these factors, the value of $$\frac{dU}{Udt}$$

is obtained by dividing the voltage induced in the output winding 64 of generator 22, i.e., $$\frac{dU}{dt}$$

by U in the dividing circuit composed of high gain amplifier 73 and potentiometer 26. Assuming the output of amplifier 73 to be Z, then the input to amplifier 73 is equal to $$\frac{dU}{dt} - ZU$$

since potentiometer 26 multiplies the output Z by the angular displacement of its movable arm 24 from the zero position, U. Considering the amplification factor of amplifier 73 to be K, then $$\frac{Z}{K} = \frac{dU}{dt} - ZU$$

or $$\frac{dU}{dt} = Z\left(U + \frac{1}{K}\right)$$

or $$Z = \frac{\frac{dU}{dt}}{U + \frac{1}{K}}$$

If K is large, then $$\frac{1}{K}$$

is small, and $$Z = \frac{dU}{Udt}$$

The value of $$\delta\frac{dU}{Udt} = \cot Ar \, \delta\frac{dAr}{dt}$$

(Equation 5) is obtained in the following manner:
A voltage proportional to $$\delta\frac{dAr}{dt} = \frac{dB}{dt} - \frac{dAr}{dt}$$

is supplied to the resistance winding 74 of cam potentiometer 38 by taking the difference between the voltages $$\left(\frac{dB}{dt}\right) \text{ and } \left(\frac{dAr}{dt}\right)$$

from output windings 56 and 67 of respective generators 14 and 39. The output of cam potentiometer 38, which is the voltage between the contact point of the movable arm 37 on the resistance winding 74 and the effective center of the resistance winding 74, is proportional to $$\cot Ar \; \delta\frac{dAr}{dt} = \delta\frac{dU}{Udt}$$

when the movable contact arm 37 is positioned at an angular displacement of $2Ar$ from its zero position. These two voltages, $$\frac{dU}{Udt}$$

from the amplifier 73 and $$\delta\frac{dU}{Udt}$$

from potentiometer 38, when connected in series, produce the corrected value of $U \cos Ar$ which is applied to the stator winding 72 of resolver 29.

When the rotor of resolver 29 is positioned by shaft 31 at an angular displacement $Ar$, with stator windings 71 and 72 energized by respective inputs of $U \sin Ar$ and $U \cos Ar$, the voltage induced in rotor winding 69, which is connected to the control input of vacuum tube attenuator 68, is U, the voltage induced in rotor winding 70, which is connected to the signal input of vacuum tube attenuator 68, is a null or zero voltage. The vacuum tube attenuator 68 regulates the size of its output signal, maintaining the ratio between output signal and error displacement of shaft 31 substantially constant, thereby preserving the desired damping of motor 34. The consequent zero voltage output of vacuum tube attenuator 68 to the control input of suppressor 65 allows normal integration of the signal from rotor winding 51 of resolver 28. However, if the rotor of resolver 29 is not positioned in accordance with the input signals to stator windings 71 and 72, a voltage is induced in rotor winding 70 which, passing through vacuum tube attenuator 68, causes suppressor 65 to cut off the integrator signal, and controls motor 34 driving shaft 31 until the rotor of resolver 29 is positioned to indicate a correct value of $Ar$.

In operation and assuming that the instrument has just been energized, that motor 13 has synchronized shaft 11 to the incoming signal in stator windings 47 and that shafts 16 and 31 have been positioned to indicate zero values of U and $Ar$, then the output of rotor windings 49, 51, 52 and 58 are all zero, thus making the computed values of $$\frac{dB}{dt}, \frac{dAr}{dt} \text{ and } \frac{dU}{dt} \text{ zero}$$

However, since the observed target bearing angle B, is changing, a signal appears at rotor winding 54 which drives motor 13, thereby producing a voltage in generator output winding 56, equal to the generated value of $$\frac{dB}{dt}$$

Then $$\frac{1}{\sin Ar}\delta\frac{dB}{dt}$$

is not zero, and motor 21 drives shafts 20 and 16 to produce a shaft value of U and at the same time a voltage $$\frac{dU}{dt}$$

in the output winding 64 of generator 22, which in turn is applied to the divider circuit producing a value of $$\frac{dU}{Udt}$$

As shaft 16 turns, being rotated by motor 21, the shaft value of U is increased and the output voltages of induction potentiometer rotor windings 49 and 58 are no longer zero, so that the computed value of $U^2 \cos Ar$ begins to increase and approach the true value.

The output signal of amplifier 73, i.e., $$\frac{dU}{Udt}$$

and the correction voltage of $$\cot Ar \delta\frac{dAr}{dt}$$

are applied to stator winding 72 of resolver 29 and the generated voltage $$\frac{dB}{dt}$$

is applied to the stator winding 71, thereby inducing voltages in rotor windings 69 and 70 which cause motor 34 to drive shafts 31 and 40, thereby changing the value of $Ar$ on these shafts. The computed values of $$\frac{dB}{dt}, \frac{dAr}{dt}, \frac{dU}{dt}$$

and $\delta U$ are also varied and a voltage is produced in the output winding 67 of generator 39, causing the error voltage proportional to $$\delta\frac{dAr}{dt}$$

to decrease, thereby decreasing $$\delta\frac{dU}{Udt}$$

This process of increasing the shaft values of $Ar$ and U and decreasing the error voltages $\delta U$ and $$\delta\frac{dAr}{dt}$$

is continued, so that the computed values of $$\frac{dB}{dt}, \frac{dU}{dt} \text{ and } \frac{dAr}{dt}$$

and hence of B, $Ar$ and U, approach the true values while the suppressors 53, 59 and 65 control voltages approach zero, eventually motor 13 is controlled by the signal input to suppressor 53, thereby integrating the $$\frac{dB}{dt}$$

signal of rotor winding 51 and producing a shaft value of B at shaft 11, whereas motor 21 is controlled by the signal input to suppressor 59, thereby integrating the value of $$\frac{dU}{dt}$$

from rotor winding 58 and producing a shaft value of U at shaft 16. Motor 34 is controlled by the signal input to suppressor 65, thereby integrating the $$\frac{dAr}{dt}$$

signal from rotor winding 51 and producing a value of $Ar$ at shaft 31.

The instrument continues to generate the solution, producing values of B, $Ar$ and U. However, should the solution be incorrect for some reason or other, so that the shaft 11 lags or leads the signal to the stator windings 47, then the signal produced in rotor winding 54 becomes significant and ultimately affects motors 13, 21 and 34, causing the generated solution to be changed in such a manner as to keep shaft 11 in synchronism with the signal at stator windings 47, and thereby again present the correct solution of the problem. It will be found advisable to delay the response of the A$r$ integrator controlling shaft 31 with respect to the U integration controlling shaft 16, in order to expedite the solution.

The displacements of shafts 16 and 31, indicating the calculated values of $$\frac{Sr}{R}$$

or U and A$r$, are directly transmitted to respective rotor windings 76 and 63 of self synchronous generators 19 and 30 and are transformed into electrical signals for transmission to other circuits. Thus, a signal voltage corresponding to A$r$ is induced in stator windings 62 of self synchronous generator 30, and a signal voltage corresponding to $$\frac{Sr}{R}$$

is induced in stator windings 75 of self synchronous generator 19, since a 400 cycle voltage is applied to the rotor windings 63 and 76, and the respective rotors are positioned at angular displacements of A$r$ and $$\frac{Sr}{R}$$

from the zero position.

Although a preferred embodiment of the invention is illustrated and described herein, it is to be understood that the invention is not limited thereby, but is susceptible of changes in form and detail within the scope of the appended claims.

We claim:

1. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatviely connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable by said second motive means relatively to a stator winding for inducing an output voltage value therein according to the angle and voltage of said rotor winding, a potentiometer having a member driven by said second motive means and a winding energized with a constant voltage, and means energized by the output of said potentiometer for modifying the input of said first motive means to thereby modify the said output voltage value.

2. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable by said second motive means relatively to a stator winding for inducing an output voltage value therein according to the angle and voltage of said rotor winding, a potentiometer having a member driven by said second motive means and a winding energized with a constant voltage, and means including a primary winding energized by the output of said potentiometer and a secondary winding inducing a voltage, and means connecting said last-named secondary winding and the input to said first motive means for modifying the input of said first motive means to thereby modify the said output voltage value.

3. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable by said second motive means relatively to a stator winding for inducing an output voltage value therein according to the angle and voltage of said rotor winding, a potentiometer having a member driven by said second motive means and a winding energized with a constant voltage, means including a primary winding energized by the output of said potentiometer and a pair of secondary windings inducing corresponding voltages, connections from one of said last-named secondary windings to the input of said first motive means for modifying the angle of rotation thereof and means energized by the output of the other of said last-named secondary windings for modifying the input of said second motive means to thereby modify the said output voltage value.

4. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable by said second motive means relatively to a stator winding for inducing an output voltage value therein according to the angle and voltage of said rotor winding, a potentiometer having a secondary winding driven by said second motive means and a primary winding energized with a constant voltage, means including a primary winding energized by the output of said potentiometer and a secondary winding inducing a corresponding voltage, a second potentiometer having a secondary winding driven by said second motive means and a primary winding energized by the voltage ouput of said last-named secondary winding, and connections from the secondary winding of said second potentiometer to the input of said second motive means for modifying the input of said second motive means to thereby modify the said output voltage value.

5. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable by said second motive means relatively to a stator winding for inducing an output voltage value therein according to the angle and voltage of said rotor winding, a potentiometer having a member driven by said second motive means and a winding, means including a primary winding and a secondary winding, connections between the last-named secondary winding and the winding of said potentiometer for energizing the same, and means energized by the output of said potentiometer for modifying the input of said second motive means to thereby modify the said output voltage value.

6. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable by said second motive means relatively to a stator winding for inducing an output voltage value therein according to the angle and voltage of said rotor winding, a potentiometer having a secondary winding driven by said second motive means and a primary winding energized with a constant voltage, means including a primary winding energized by the output of said first potentiometer and a pair of secondary windings in the field of said primary winding for inducing corresponding voltages, a second potentiometer having a secondary winding driven by said second motive means and a primary winding energized by the voltage output of one of said pair of secondary windings, connections from the secondary winding of said second potentiometer to the input of said second motive means for modifying the movement thereof, connections between the other of said pair of secondary windings and the input of said first motive means to thereby modify the said output voltage value.

7. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable by said second motive means relatively to a stator winding for inducing an output voltage value therein according to the angle and voltage of said rotor winding, a potentiometer having a member driven by said second motive means and a winding, means including a primary winding and a secondary winding in the field of said last-named primary winding for inducing a corresponding voltage, connections between said last-named secondary winding and the winding of said potentiometer for energizing the same, a generator driven by said second motive means, and means energized by the output of said last-named generator and by the output of said potentiometer for modifying the input of said second motive means to thereby modify the said output voltage value.

8. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable by said second motive means relatively to a stator winding for inducing an output voltage value therein according to the angle and voltage of said rotor winding, a potentiometer having a member driven by said second motive means and a winding and means including a primary winding and a pair of secondary windings in the field of said last-named primary winding for inducing corresponding voltages, connections between one of said last-named secondary windings and the winding of said potentiometer for energizing the same, a generator driven by said second motive means, means energized by the output of said last-named generator and by the output of said potentiometer for modifying the input to said second motive means, and connections between the other of said last-named secondary windings and the input to said first motive means for modifying the input of said first motive means to thereby modify the said output voltage value.

9. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable by said second motive means relatively to a stator winding for inducing an output voltage value therein according to the angle and voltage of said rotor winding, a potentiometer having a member driven by said second motive means and a winding energized in accordance with the voltage output of said generator, and means energized by the output of said potentiometer for modifying the input of said second motive means to thereby modify the said output voltage value.

10. In ordnance calculating apparatus, the commbination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable by said second motive means relatively to a stator winding for inducing an output voltage value therein according to the angle and voltage of said rotor winding, a potentiometer having a member driven by said second motive means and a winding energized in accordance with the voltage output of said generator, a third transformer having a stator winding energized by the output of said potentiometer and a rotor winding angularly positioned in the field of said last-named stator winding by said second motive means for inducing a corresponding voltage, and connections between the said last-named rotor winding and the input of said second motive means for modifying the input of said second motive means to thereby modify the said output voltage value.

11. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable by said second motive means relatively to a stator winding for inducing an output voltage value therein according to the angle and voltage of said rotor winding, a potentiometer having a member driven by said second motive means and a winding energized in accordance with the voltage output of said generator, a third transformer having a pair of stator windings, one stator winding energized by the output of said potentiometer and the other stator winding energized in accordance with the output of said generator, a rotor winding angularly positioned in the field of said last-named stator windings by said second motive means for inducing a corresponding voltage, and connections between the said last-named rotor winding and the input of said second motive means for modifying the input of said second motive means to thereby modify the said output voltage value.

12. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable by said second motive means relatively to a stator winding for inducing an output voltage value therein according to the angle and voltage of said rotor winding, a potentiometer having a member driven by said second motive means and a winding energized with a constant voltage, means including a primary winding energized by the output of said potentiometer and a secondary winding angularly movable in the field of said last-named primary winding for inducing a corresponding voltage, a third motive means for angularly moving the last-named secondary winding, and connections between said last-named secondary winding and the input to said first and third motive means.

13. In ordnance calculating apparatus, the combination of a transformer having a primary winding energized by a voltage in accordance with a signal input and a secondary winding angularly movable in the field of said primary winding for inducing a voltage in accordance with its angular position in said fiield, motive means operatively connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable by said second motive means relatively to a stator winding for inducing an output voltage value therein according to the angle and voltage of said rotor winding, a potentiometer having a member driven by said second motive means and a winding energized with a constant voltage, means including a primary winding energized by the output of said potentiometer and a secondary winding angularly movable in the field of said last-named primary winding for inducing a corresponding voltage, a third motive means for angularly moving the last-named secondary winding, connections between said last-named secondary winding and the input to said first and third motive means, and a third transformer having a rotor winding energized with a constant voltage and angularly movable by said third motive means relatively to a corresponding stator winding for inducing an output voltage value therein according to the angle and voltage of said last-named rotor winding.

14. In ordnance calculating apparatus, the combination of an input transformer having a primary winding energized by a voltage in accordance with observed target bearing and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage in accordance with the rate of change of the angle driven, second motive means energized in accordance with said last-named voltage, an output transformer having a rotor winding energized with a constant voltage and angularly movable by said second motive means relatively to a stator winding for inducing an output voltage value therein corresponding to the ratio of relative speed to target range, a generator driven by said second motive means, a transformer having primary windings energized in accordance with the voltage outputs of said generators and secondary windings angularly movable in the field of said primary windings, a third motive means energized in accordance with the output of said last-named secondary windings, operative connections between said third motive means and said last-named secondary windings, and a second output transformer having a rotor winding energized with a constant voltage and angularly movable by said third motive means relatively to a stator winding for inducing an output value therein corresponding to relative target angle.

15. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable relatively to a stator winding by said second motive means for inducing an output voltage value therein according to the angle and voltage of said rotor winding, a potentiometer having a member driven by said second motive means and a winding energized with a constant voltage, means including a primary winding energized by the output of said potentiometer and a pair of secondary windings inducing corresponding voltages, connections from one of said last-named secondary windings to the input of said first motive means, a voltage suppressor in said last-named connections, connections between the other of said last-named secondary windings and the input to said second motive means, and a voltage suppressor in said last-named connections.

16. In ordnance calculating apparatus, the combination of an input transformer having a primary winding energized by a voltage and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, an output transformer having a rotor winding energized with a constant voltage and angularly movable by said second motive means relatively to a stator winding for inducing an output voltage, a generator driven by said second motive means, a transformer having primary windings energized in accordance with the voltage outputs of said generators and secondary windings angularly movable in the field of said last-named primary windings, a third motive means connected to the output of said last-named secondary windings, attenuating means interposed in said last-named connections for modifying the input to said third motive means, and operative connections between said third motive means and said last-named secondary windings.

17. In ordnance calculating apparatus, the combination of a transformer having a primary winding energized by a voltage in accordance with a signl input and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, a generator driven by said second motive means for generating a voltage, a transformer having primary windings energized in accordance with the voltage outputs of said generators and secondary windings angularly movable in the field of said last-named primary windings, a third motive means connected to the output of said last-named secondary windings for energization thereby, operative connections between said third motive means and said last-named secondary windings for angularly moving the latter, and a generator driven by the third motive means and having its output interposed in the last-named connections for modifying the operation of said third motive means.

18. In ordnance calculating apparatus, the combination of a transformer having a primary winding energized by a voltage in accordance wtih a signal input and a secondary winding angularly movable in the field of said primary winding for inducing a voltage in accordance with its angular position in said field, motive means operatvely connected to said secondary winding for angularly moving said secondary winding to non-inductive position in said field, a generator driven by said motive means for generating a voltage, second motive means energized in accordance with said last-named voltage, a generator driven by said second motive means for generating a voltage, a potentiometer having a member driven by said second motive means and a winding, an amplifier, connections between the outputs of said second generator and said potentiometer and the input to said amplifier, connections between the output of said amplifier and said potentiometer winding, a transformer having primary windings energized in accordance with the voltage outputs of said amplifier and said first-named generator and secondary windings angularly movable in the field of said last-named primary windings, a third motive means energized in accordance with the output of said last-named secondary windings, operative connections between said third motive means and said last-named secondary windings for angularly moving the latter, and an output transformer having a rotor winding energized with a constant voltage and angularly movable by said third motive means relatively to a stator winding for inducing a corresponding output voltage therein.

19. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving said secondary winding to non-inductive position in said field, a generator driven by said motive means for generating a voltage, second motive means energized in accordance with said last-named voltage, a second transformer having a rotor winding energized with a constant voltage and angularly movable by said second motive means relatively to a stator winding for inducing an output voltage value therein according to the angle and voltage of said rotor winding, a potentiometer having a member driven by said second motive means and a winding energized in accordance with the voltage output of said generator, a third transformer having a stator winding energized by the output of said potentiometer and a rotor winding angularly positioned in the field of said last-named stator winding by said second motive means for inducing a corresponding voltage, connections between the said last-named rotor winding and the input of said second motive means, and attenuating means in said last-named connections whereby the input of said second motive means is modified.

20. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving the same, a generator driven by said motive means for generating a voltage, second motive means energized in accordance with said last-named voltage, a reversing switch interposed between said generator and said second motive means, a potentiometer having a member driven by said second motive means and an energized winding, a third motive means, connections between said potentiometer member and the input of said third motive means, and operative connections between said third motive means and said switch for operating the latter.

21. In ordnance calculating apparatus, the combination of a transformer having a primary winding energized by a voltage in accordance with a signal input and a secondary winding angularly movable in the field of said primary winding for inducing a voltage in accordance with its angular position in said field, motive means operatively connected to said secondary winding for angularly moving the same, a generator driven by said motive means for generating a voltage, second motive means energized in accordance with said last-named voltage, a reversing switch interposed between said generator and said second motive means, a cam for actuating said switch, a potentiometer having a member driven by said second motive means and an energized winding, a third motive means, connections between said potentiometer member and the input of said third motive means and operative connections between said third motive means and said cam.

References Cited in the file of this patent

UNITED STATES PATENTS

| | | |
|---|---|---|
| 2,463,687 | Gittens | Mar. 8, 1949 |
| 2,475,314 | Dehmel | July 5, 1949 |
| 2,497,216 | Greenough | Feb. 14, 1950 |